United States Patent Office 3,029,290
Patented Apr. 10, 1962

3,029,290
RING-SUBSTITUTED HALO ALPHA,ALPHA'-XYLENE-OLS
Robert F. Lindemann, Painesville, and Roland J. Horvath, Cleveland, Ohio, assignors to Diamond Alkali Company, Cleveland, Ohio, a corporation of Delaware
No Drawing. Filed Apr. 30, 1958, Ser. No. 731,866
4 Claims. (Cl. 260—618)

The present invention relates to compounds of the structure:

(I)
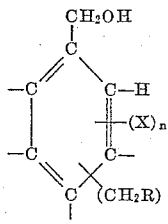

wherein $n$ is a number from 1 to 3, e.g., 1 to 2; X is halogen, e.g., fluorine, chlorine, bromine and iodine, chlorine being preferred, R is selected from the group consisting of hydrogen and hydroxyl radicals, the remaining free bonds being satisfied by hydrogen; and to their preparation and application.

The compounds of this invention may be prepared by chemically reacting a hydrolyzing agent with a compound of the structure.

(II)
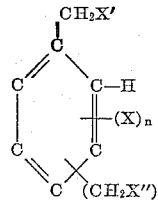

wherein $n$ is a number from 1 to 3, inclusive, e.g., 1 to 2; X and X' are halogen, chlorine being preferred, X" being selected from the group consisting of hydrogen and halogen, the remaining free bonds being satisfied by hydrogen. Suitable hydrolyzing agents are alkali metal carbonates, such as potassium carbonate or sodium carbonate, sodium carbonate being preferred, and alkali metal hydroxides, such as potassium or sodium hydroxide, these dry materials being in solution. The reaction is typically carried out at a temperature within the range from 40° to 150° C., e.g., at reflux temperature, such as 80° to 115° C. The hydrolyzing agent is preferably in aqueous solution, such as one containing 1–5 parts by weight hydrolyzing agent in 10 to 70 parts by weight water, being chemically combined therewith 0.1 to 10 parts by weight of a compound represented by structure II. Preferably, the ratios of reactants are 1 to 3 parts by weight hydrolyzing agent, 1 to 3 parts by weight compounds represented by the structure II, and 30 to 50 parts by weight water, e.g., 20 to 22 parts by weight of a compound of structure II, 16 to 19 parts by weight of sodium carbonate, and 240 to 260 parts by weight of water. The reaction typically is carried to completion, e.g., in about 1 to 10 hours, especially 6 to 9 hours. Compounds according to structure I may be separated or purified via distillation and/or recrystallization, typically from water.

Alternatively, compounds within the scope of structure I above may be prepared by chemically reacting the respective acetate derivatives represented by the structure (III)
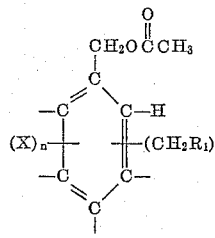

wherein X and $n$ are as defined, $R_1$ being selected from the group consisting of hydrogen and acetate radicals, with a transesterifying agent; such as chemically reacting 4,6-dichloro-m-xylene diol diacetate with hydrogen chloride, preferably in the presence of a solvent, e.g., a lower alkanol such as ethanol, to form 4,6-dichloro-m-xylenediol.

The term transesterifying agent is intended to refer broadly to any compound causing the ester group in structure III above, i.e.

to be replaced by a hydrogen atom. Preferred transesterifying agents of this invention are hydrogen chloride and hydrogen bromide; however, other suitable agents are set forth in The Encylopedia of Chemical Technology, vol. 5, page 818.

The reactants are combined in essentially stoichiometric amounts although deviation from these ratios may be made without serious detriment to the reaction. The preparation is carried out typically at a temperature within the range from 0°–200° C., preferably 0°–60° C., generally until reaction is complete, e.g., about ¼ to 96 hours, i.e., 1 to 48 hours. The desired product may be isolated through recrystallization from a solvent or distilled, preferably at reduced pressure.

The preferred compounds within structure I are 2 - chloro - p - xylene - alpha,alpha' - diol; 4,6 - dichloro-m-xylene-alpha,alpha'-diol; 4,6-dichloro-m-xylene-alpha-ol; 2-chloro-m-xylene-alpha-ol; 2-chloro-m-xylene-alpha,alpha'-diol; 2,4-dichloro-m-xylene-alpha-ol; 2,4-dichloro-m-xylene-alpha,alpha'-diol; and 2,5-dichloro-p-xylene-alpha,alpha'-diol.

The hydroxy compounds are useful as chemical intermediates such as the reaction of the dihydroxymethyl compounds with phosgene in an inert solvent to form the dichloroformate. Further they exhibit biological activity such as fungicidal activity, i.e., the control of spore germination.

It will be understood, of course, that the compounds of the present invention may be utilized in diverse formulations, both liquid and solid, including finely-divided powders and granular materials, solutions, concentrates, emulsifiable concentrates, slurries and the like, depending upon the application intended and the formulation medium desired. Thus it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids, such as kerosene, benzene, toluene, xylene, cyclohexanone and other petroleum distillate fractions or mixtures thereof. When liquid formulations are employed, or dry materials prepared which are to be used in liquid form, it is desirable in certain instances to additionally employ a wetting, emulsifying, or dispersing agent to facilitate use of the formulation, suitable surface active agents being set out, e.g., in an article by John W. McCutcheon in Soap and Chemical Specialties, vol. 31, Nos. 7–10 (1955).

The term "carrier" as employed in the specification and claims is intended to refer broadly to the materials constituting a major proportion of a biologically active or other formulation and hence includes finely-divided material, both liquids and solids, as aforementioned, conventionally used in such applications.

The compounds of the present invention may be used alone or in combination with other known biologically active materials, such as chlorinated hydrocarbons, organic phosphorous compounds, foilage and soil fungicides, pre- and post-emergent herbicides and the like.

The term "fungicide" as used in the specification and claims is intended to refer broadly to a composition of matter effective in controlling or killing collectively or selectively fungus growth which is either parasitic or saprophytic, such as the control of fungus spore germination, blight infestation, e.g., control of early and late blight disease; moreover, it is preferred that the fungus be contacted with a fungicidal amount of the composition.

In order to demonstrate this fungicidal activity, a series of tests are run incorporating evaluations of the fungicidal effectiveness of compounds within the scope of structure I against (A) fungus spore germination, i.e., the spore germination of *Alternaria oleracea* and *Monilinia fructicola*, and (B) blight fungus, i.e., the early and late blight fungus.

The procedures of fungicidal evaluations A and B are as follows:

The procedure in fungicidal evaluation A above concerning fungicidal spore germination against *Alternaria oleracea* and *Monilinia fructicola* is:

Spore germination tests on glass slides are conducted via the test tube dilution method adopted from the procedure recommended by the American Phythopathological Society's committee on standardization of fungicidal tests. In this procedure, the test chemical in aqueous formulations at concentrations of 1000, 100, 10 and 1.0 p.p.m. is tested for its ability to inhibit germination of spores from 7 to 10-day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Each test compound is given a rating which corresponds to the concentration that inhibits germination of half the spores (ED 50 value). Employing this procedure, 2-chloro-p-xylene-alpha,alpha'-diol receives an ED 50 value of from 100–1000 p.p.m., whereas alpha,alpha'-p-xylenediol and 2,3,5,6-tetrachloro-p-xylene-alpha,alpha'-diol exhibit relatively no activity.

The procedure in fungicidal evaluation B above concerning early blight control is:

A tomato foliage disease test is conducted measuring the ability of the test compound to protect tomato foliage against infection of the early blight fungus *Alternaria solani*. Tomato plants 5 to 7 inches high of the variety Bonny Best are employed. The plants are sprayed with 100 ml. of test formulation at 2000 p.p.m. and 400 p.p.m. test chemical in combination with 5% acetone–0.01% Triton X–155—balance water at 40 lbs. air pressure while being rotated on a turntable in a spray chamber. After the spray deposit is dry, the treated plants and comparable untreated controls are sprayed with a spore suspension containing approximately 20,000 conidia of *Alternaria solani* per ml. The plants are held in a 100% humid atmosphere for 24 hours at 70° F. to permit spore germination and infection. After 2 to 4 days, lesion counts are made on the three uppermost fully expanded leaves. Results based on the number of lesions obtained indicates significant blight control employing 2-chloro-p-xylene-alpha,alpha'-diol.

Concerning the present invention the following specific examples are not to be construed as limiting but rather are offered in order that those skilled in the art may more completely understand the present invention.

EXAMPLE I

*Preparation of 2-Chloro-p-Xylene-Alpha,Alpha'-Diol*

525 g. of 2-chloro-p-xylylene dichloride is dissolved in a solution comprising 450 g. of anhydrous sodium carbonate and 6 liters of water. The mixture is then refluxed with stirring in a flask for about 8 hours, preferably until reaction completion. About 4 liters of water is then removed through distillation, the residue removed from the container, cooled to about 5° and filtered, yielding the desired diol. The product is then recrystallized from a minimum amount of water (about 1500 ml.) using decolorizing carbon to remove any color. This yields the desired $C_8H_9ClO_2$, M.P. 101°–103° C.

EXAMPLE II

*Preparation of 4,6-Dichloro-m-Xylene-Alpha,Alpha'-Diol*

5 g. of 4,6-dichloro-m-xylene-diol diacetate is dissolved in ethanol and anhydrous hydrogen chloride is passed into the solution. This transesterification reaction is allowed to continue at reflux for about 72 hours. The reactant mixture is then cooled to room temperature, allowing the diol to crystallize out as white needles. This desired product is then recrystallized from ethanol yielding the desired $C_8H_8Cl_2O_2$ indicated through the following elemental analytical data:

| Element | Actual Percent by wt. | Calculated Percent by wt. |
| --- | --- | --- |
| C | 46.4 | 46.4 |

EXAMPLE III

*Preparation of 4,6-Dichloro-m-Xylene-ol*

5 g. of 4,6-dichloro-3-methyl benzyl acetate is dissolved in ethanol and anhydrous hydrogen chloride is passed into the solution. The transesterification reaction is allowed to continue at reflux for 15 to 48 hours. The reactant mixture is then cooled to room temperature, allowing the product to crystallize out. This desired $C_8H_8Cl_2O$ is recrystallized from ethanol and is indicated through the following elemental analytical data:

| Element | Actual percent by wt. | Calculated percent by wt. |
| --- | --- | --- |
| C | 50.3 | 50.3 |
| H | 4.22 | 4.17 |
| Cl | 37.1 | 36.6 |

EXAMPLE IV

*Preparation of 2,5-Dichloro-p-Xylene-Alpha,Alpha'-Diol*

260 g. of 2,5-dichloro-p-xylene-diol-diacetate is placed in 50 ml. of concentrated hydrogen chloride. The reaction mixture is then refluxed for about 22 hours with constant stirring. The product precipitates upon cooling yielding the desired $C_8H_8Cl_2O_2$, melting at 201°–202° C., and indicated by the following elemental analytical data:

| Element | Actual percent by wt. | Calculated percent by wt. |
|---|---|---|
| C | 45.73 | 45.53 |
| H | 3.80 | 4.10 |
| Cl | 34.98 | 35.19 |

It is to be understood that although the invention has been described with specific reference to particular embodiments thereof, it is not to be so limited since changes and alterations therein may be made which are within the full intended scope of this invention as defined by the appended claims.

What is claimed is:

1. 2-chloro-p-xylene-alpha,alpha'-diol.

2. The method of preparing 2-chloro-p-xylene-alpha,alpha'-diol comprising chemically reacting at a temperature below 150° C. 2-chloro-p-xylene-alpha,alpha'-dichloride with a hydrolyzing agent.

3. The method according to claim 2 wherein the hydrolyzing agent is an alkali metal carbonate.

4. The method of preparing 2,5-dichloro-p-xylene-alpha,alpha'-diol comprising chemically reacting 2,5-dichloro-p-xylene-diol-diacetate and concentrated aqueous hydrogen chloride.

References Cited in the file of this patent

UNITED STATES PATENTS

| | | |
|---|---|---|
| 2,631,168 | Ross et al. | Mar. 10, 1953 |
| 2,806,883 | Mikeska et al. | Sept. 17, 1957 |

OTHER REFERENCES

Aschan et al.: Cited in Beilstein Handbuch Org. Chem., vol. 8, page 615 (1925).

Brimelow et al.: Chem. Abstracts, vol. 46 (1952) pages 2002–03 (2 pages).

Groggins et al.: "Unit Processes In Organic Synthesis," (4th ed., 1952) pages 616, 617, 618, 619, 620 (2 pages), 654 (4 pages). Published by McGraw-Hill Book Company, Inc., New York.